United States Patent [19]
Vreenegoor

[11] Patent Number: 4,601,864
[45] Date of Patent: Jul. 22, 1986

[54] METHOD AND APPARATUS FOR THE PRODUCTION OF POLYMERIC FOAM

[75] Inventor: Nicholas C. Vreenegoor, Bennebroek, Netherlands

[73] Assignee: Unifoam AG, Glarus, Switzerland

[21] Appl. No.: 610,493

[22] Filed: May 15, 1984

[30] Foreign Application Priority Data

Dec. 6, 1983 [GB] United Kingdom ............... 8314010

[51] Int. Cl.$^4$ .................... B29C 67/22; B29C 39/42
[52] U.S. Cl. ........................ 264/37; 264/53; 264/101; 264/500; 425/74; 425/89; 425/224; 425/817 R; 425/DIG. 60
[58] Field of Search ................ 264/500, 37, 101, 51, 264/321, 45.8, 53; 425/342.1, 817 R, DIG. 60, 74, 89, 224

[56] References Cited

U.S. PATENT DOCUMENTS

| | | | |
|---|---|---|---|
| 2,898,626 | 8/1959 | Alderfer et al. | 264/45.8 X |
| 3,011,218 | 12/1961 | Mitten | 264/45.8 |
| 3,016,575 | 1/1962 | Ebneth | 264/321 X |
| 3,112,524 | 12/1963 | Legler | 264/321 X |
| 3,131,426 | 5/1964 | Legler | 264/321 X |
| 3,329,759 | 7/1967 | Rice | 264/321 |
| 3,456,047 | 7/1969 | Vinton et al. | 264/321 X |
| 3,475,525 | 10/1969 | Peters | 264/321 X |
| 4,051,211 | 9/1977 | Beser et al. | 264/51 |
| 4,278,624 | 7/1981 | Kornylak | 264/37 |
| 4,328,368 | 5/1982 | Salloum et al. | 264/37 X |

FOREIGN PATENT DOCUMENTS

| | | | |
|---|---|---|---|
| 0023749 | 2/1981 | European Pat. Off. | |
| 2101238 | 11/1975 | Fed. Rep. of Germany | 264/500 |
| 192960 | 11/1964 | Sweden | 264/500 |
| 1235915 | 6/1971 | United Kingdom | |
| 2050922A | 1/1981 | United Kingdom | |
| 2100175 | 12/1982 | United Kingdom | 264/500 |

*Primary Examiner*—Philip Anderson
*Attorney, Agent, or Firm*—Laubscher & Laubscher

[57] ABSTRACT

In the production of polymeric foam in particular polyurethane foam slabstock, a mixture of foam reactants is allowed to expand in a closed mould while substantially atmospheric pressure is maintained above the upper surface of the foam. After expansion is completed, air is supplied to the foam upper surface and noxious gases in the foam are removed through one or more apertures in the lower region of the mould. Preferably, the air supplied is dry. Removed gases may be collected for recycling. Air may be supplied during foam expansion. Various mould aperture arrangements and means for progressively covering the mould are described.

30 Claims, 12 Drawing Figures

METHOD AND APPARATUS FOR THE PRODUCTION OF POLYMERIC FOAM

SPECIFICATION BRIEF DESCRIPTION OF THE PRIOR ART

This invention relates to a method of, and apparatus for, manufacturing polymeric foam, such as polyurethane foam, in particular foam slabstock or buns.

Polyurethane foam may be produced by mixing a polyol with toluene-di-isocyanate (T.D.I.), water stabilizers and suitable catalysts. The chemical reaction produces carbon di-oxide which causes the mixture of reactants to expand into a foam and the reaction is exothermic. The density of the resultant foam can be controlled depending on the amount of water added but, if the proportion of water exceeds about 4.8 parts per hundred, the exothermic temperature will rise to an unacceptable level; i.e. greater than 170° C. Therefore, if further control of density is required, it is necessary to add a propellant such as Freon 11 and/or methylene chloride to assist the expansion process.

The manufacture of foam slabstock or buns is usually carried out in an open-topped mould, which may be a static mould or a channel-shaped conveyor, e.g. as described in our British patent specification No. 1235915. After the foam expansion process has ceased, and during the process, all the aforementioned gases together with a relatively small quantity of the T.D.I. escape into the atmosphere and, apart from the carbon di-oxide, they are all environmentally undesirable. After the expanded foam has solidified sufficiently to be removed from the conveyor, side linings of paper or polyethylene film are removed and cut lengths of foam are stored while the foam fully cures. During this time, noxious gases throughout the volume of the block gradually leak from the block to contaminate the atmosphere.

It has been proposed to enclose the mould. For example, British patent specification No. 2,050,922A describes a process for producing foam slabstock in which a channel-shaped conveyor is mounted in a closed chamber and the pressure within the chamber is reduced with the object of producing foam having a lower weight per volume for a given foam formulation. To the extent that gases leaving the foam may be contained and extracted during the expansion process, it is clear that this can apply only to gases leaving the upper surface of the foam. Furthermore, the slabstock leaving the chamber will be saturated with noxious gases.

European patent application No. 23749 describes a system of closed moulds which are connected to means for reducing the pressure in the moulds to less than normal atmospheric pressure as soon as a mixture of foam reactants has been introduced. Here again, only gases leaving the upper surface of the foam are extracted and it is inevitable that some noxious gases must remain in the expanded foam.

SUMMARY OF THE INVENTION

An object of the present invention is to enable polymeric foam products to be produced so that substantially all noxious gases may be positively removed from the product and prevented from escaping to atmosphere during and after the production process.

It is a further object of the invention to enable at least some of the removed gases to be collected for recycling.

Another object of the invention is to provide apparatus for achieving the aforementioned objects.

According to one feature of the present invention, a method of manufacturing polymeric foam comprises depositing a mixture of foam reactants in a mould, closing the mould and allowing the reactants to react and expand therein characterized by, the steps of maintaining substantially atmospheric pressure in the space above the upper surface of the reacting and expanded foam, supplying air to the upper surface of the expanded foam, and removing gases present in the expanded foam from the lower region of the mould.

Preferably, the removal of said gases is commenced after a predetermined time interval after the foam reactants have fully expanded and is continued until the expanded foam is fully cured.

Preferably, gases removed from the foam are collected for recycling.

According to another feature of the invention, apparatus for manufacturing polymeric foam comprises a mould, means for depositing a mixture of foam reactants in said mould, and a closure for said mould, characterized in that said closure permits the interior of the mould to be maintained at substantially atmospheric pressure, and there is provided means for supplying air to the mould below said closure, and means located in the lower regions of said mould for removing gases from expanded foam within said mould.

The invention enables polymeric foam, particularly foam slabstock, to be produced in an environment which is at atmospheric pressure and with a resulting product which is free of any significant quantity of noxious gases, if any, when the product is removed from the mould.

Preferably dry air is supplied to the upper surface of the foam, in which case the invention provides the further advantage that absorption by the foam of ambient water vapour is reduced or avoided during curing of the foam, which otherwise would reduce the level of TDI still active in the foam. Thus, less TDI is necessary in the original mixture of foam reactants than would otherwise be necessary to ensure the desired minimum hardness throughout the product. Also, the average hardness throughout the block is considerably increased.

BRIEF DESCRIPTION OF THE DRAWINGS

Details of the invention will now be described with reference to the accompanying drawings in which.

DETAILED DESCRIPTION

Although it will be apparent that the invention may be applied to the continuous manufacture of polymeric foam, using a channel-shaped conveyor, the invention will be described with reference to manufacture in static moulds.

Figure 1:
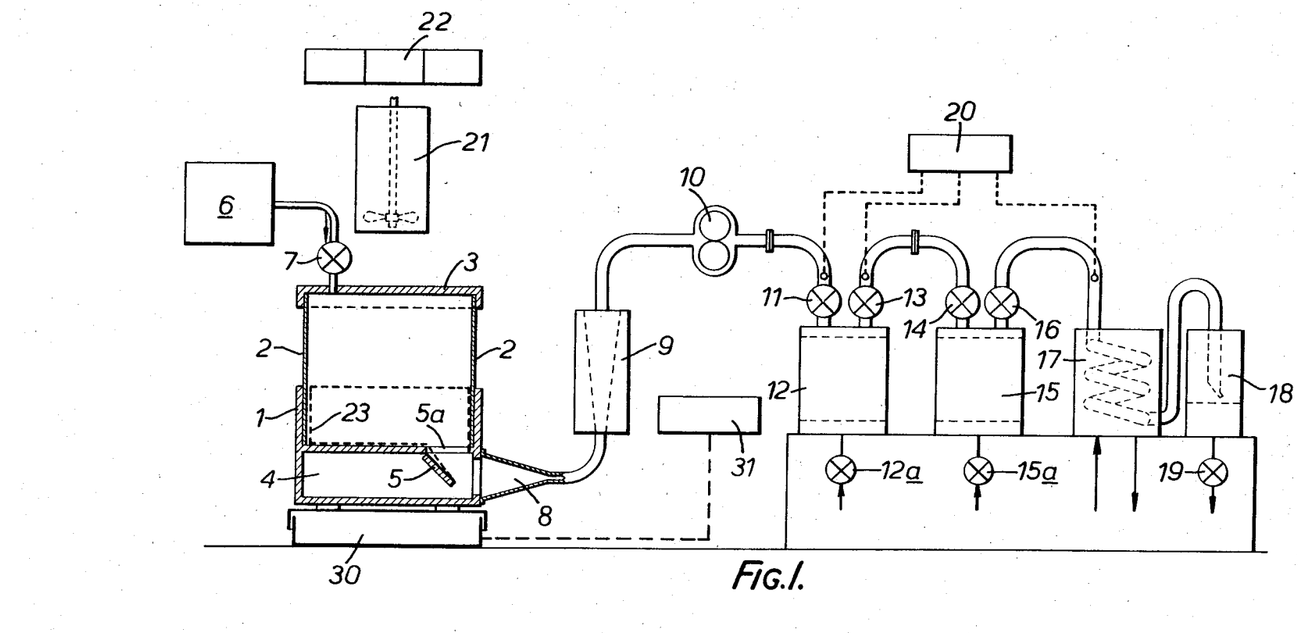
FIG. 1 is a diagrammatic representation of one embodiment of apparatus for carrying out the invention.

Referring to FIG. 1, a box mould comprises a bottom tray 1, sides 2 which may be constituted by a cardboard sleeve located in the tray 1, and a lid 3. Immediately below the tray 1, which constitutes the bottom of the mould, is a chamber 4 which may be placed in communication with the mould by opening a hinged trap door or flap 5 (hereinafter referred to as a "trap") in an aperture 5a in the bottom of the tray 1. The trap may be opened and closed by suitable means, not shown.

Connected to the mould lid 3 is an air supply duct leading through a control valve 7 to a source 6 of air. Preferably, source 6 is a source of dry air. Connected to the chamber 4 is a gas extraction duct comprising a diffuser 8, flow meter 9 and pump 10. From the pump 10, the extraction duct leads through a valve 11 to a first active carbon filter unit 12, which is connected through valves 13 and 14 to a second active carbon filter unit 15. The output of the unit 15 leads through a valve 16 and a condenser 17 to a collecting vessel 18 having an outlet valve 19.

The filter units 12 and 15 each have a steam inlet, controlled by valves 12a and 15a respectively, and the units may be the type 690 E.S.M.P. supplied by Brinkman & Germeraad of Enschede, Netherlands. Probes located in the ducts leading to and from the filter units are connected to an apparatus 20 which displays an indication of the gas concentration at the respective probes.

Above the mould is a mixing head 21 supplied with foam reactants from respective storage tanks represented at 22. In use, the mould lid 3 is removed, the trap 5 is closed and a lining of e.g. polyethylene film, indicated by broken lines 23, is placed in the bottom of the mould. Where the lining overlies the trap 5, it is secured to the trap as by adhesive and may be perforated along a line corresponding to the periphery of the trap. A mixture of foam reactants from the mixing head 21 is deposited in the bottom of the mould and the lid 3 is replaced, with air inlet valve 7 closed.

A predetermined time after the foam has ceased to expand, the valve 7 is opened, the pump 10 is switched on and the trap 5 is opened. The trap detaches and retains the overlying portion of the lining 23 and also a corresponding portion of the bottom skin of the foam block. Valves 11,13,14 and 16 are open and valves 12a, 15a and 19 are closed. Air is drawn through the valve 7 and through the foam block, entraining the gases in the block and carrying them through the trap opening 5a into the chamber 4 and to the filters 12 and 15. Thus, the closure 3 permits the mould to be maintained at substantially atmospheric pressure, and the conduit containing valve 7 provides means for supplying air to the mould below said closure, the trap 5 defining means located in the lower regions of said mould for removing gases from expanded foam within said mould.

The gases in the foam block will comprise air, water vapour, carbon di-oxide, a small quantity of TDI, tertiary amines, and Freon 11 and/or methylene chloride. It has been found that drawing air downwardly through the foam block and out from the bottom of the block effectively removes substantially all gases from the block into the filters 12 and 15. The water vapour, tertiary amines and TDI, and their chemical compound, are absorbed by the first filter 12. Some of the Freon 11 and/or methylene chloride will be absorbed by the filter 12 and the remainder by the second filter 15.

When all the gases have been removed from the foam block, the pump 10 is switched off and valve 7 closed, the mould lid 3 is removed and the block, with if desired the sides 2, is removed from the mould which is then prepared for the next foaming operation.

When the apparatus 20 indicates that the gas concentration at the output from filter 15 is reaching an unacceptable level then, before the next foaming operation, valve 11 is closed (the pump 10 being switched off) and steam is introduced through the valves 12a and 15a to purge the filters 12 and 15. The gas-laden steam is condensed in the condenser 17 and the condensate collected in the vessel 18. Due to chemical reaction with water vapour, the T.D.I. in filter 12 will have been converted to a solid compound which will remain in the filter. As the Freon 11 and/or methylene chloride, now in liquid form, have a specific gravity some 50% higher than water, these chemicals will separate from the water in the vessel 18 and can be drained off through valve 19 for re-cycling.

Figure 2:
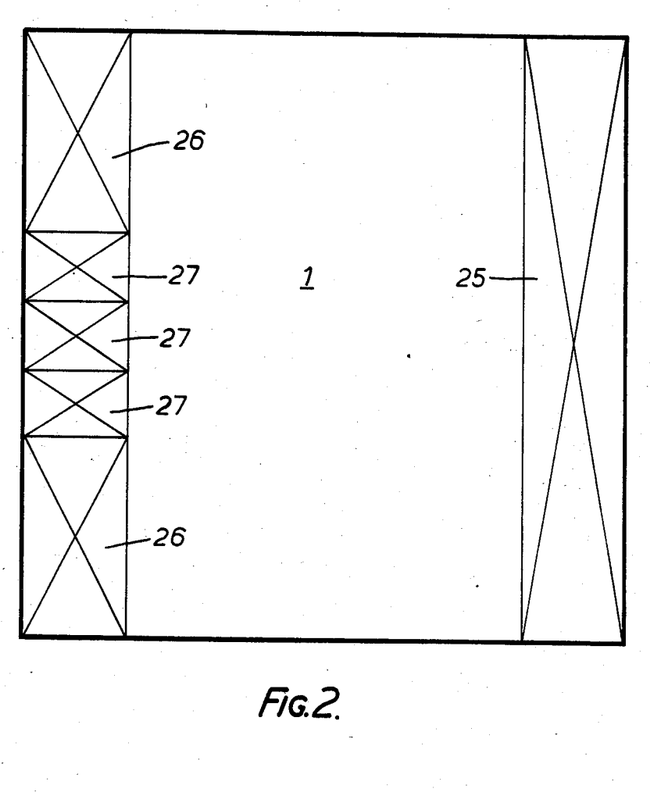
FIG. 2 is a plan view of the bottom of a mould.

The trap 5 in the bottom of the mould may be adjustable in size or several traps may be provided so that one or more can be operated to produce a trap opening of the required size. FIG. 2 shows a diagram representing an internal plan view of a mould bottom tray 1, typically 1 meter square. Six traps are provided, each independently operable. On one side is a single trap 25 and on the opposite side an area similar to that of trap 25 is divided into two traps 26 and three traps 27 each one third the area of a trap 26. With such an arrangement, a single trap 27 will provide an opening approximately 2% of the total area of the mould bottom whilst, with all the traps opened, the total opened area is approximately 36% of the area of the mould bottom.

EXAMPLE

Apparatus as described with reference to FIG. 1 was used, the box mould being 1 meter cube and having a trap providing an opening approximately 18% of the total bottom area. Three successive foaming operations were carried out with different mixtures of foam reactants to produce foam densities as follows:

Grade A of density 16 kg/m$^3$.
Grade B of density 24 kg/m$^3$.
Grade C of density 40 kg/m$^3$.

Figure 3:
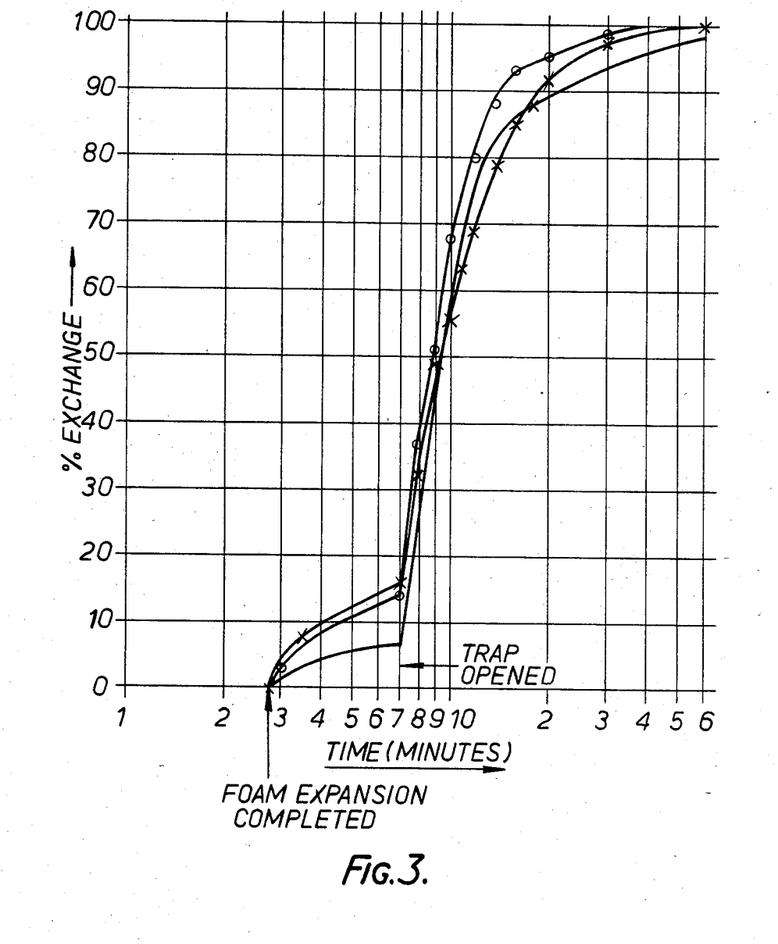
FIG. 3 is a graph showing results obtained by the invention.

In each case, after the reactants were poured into the mould and the lid replaced, foam expansion was completed in 2 minutes 45 seconds. After a further 4 minutes and 15 seconds (7 minutes after pouring) the trap was opened and the pump 10 switched on. The valve 7 was adjusted so that dry air was drawn through the mould at 500 liters/minute, as measured by the flowmeter 9. The mould was mounted on a weighing platform, indicated at 30 in FIG. 1, and having a read-out scale 31. By noting the change in mould weight with time, the amount of gases extracted was calculated in terms of the percentages of gases replaced by dry air in the foam block—the exchange percentages. FIG. 3 shows graphs in respect of each foam grade plotted as exchange percentages with reference to a linear vertical axis and time, in minutes, with reference to a logarithmic horizontal axis.

It will be seen that, with all three grades, 90% exchanges occurred within about 20 minutes from the time of pouring and 100% exchanges within about 60 minutes from pouring.

The invention by enabling dry air to flow down through the block while the foam is curing, avoids the usual absorption by the foam of ambient water vapour which otherwise would react with and thus reduce the level of TD1 still active in the block and essential for achieving the required hardness of the foam. Thus, less TD1 is necessary in the original mixture of foam reactants than would otherwise be required to ensure the desired minimum hardness throughout the block. Furthermore, it has been found that the average hardness throughout the block is considerably increased.

Figure 4:
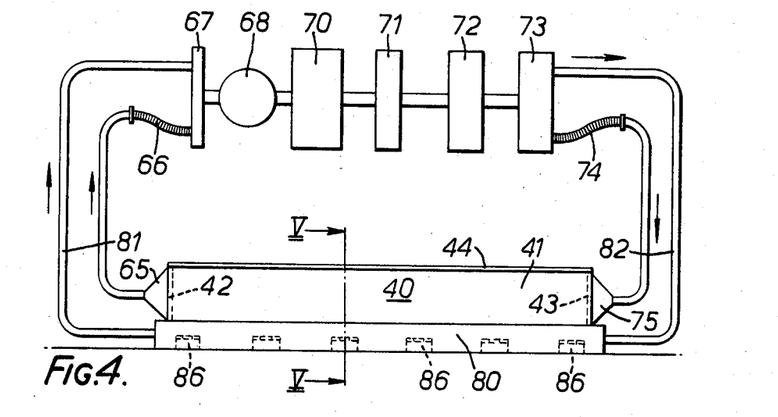
FIG. 4 is a diagrammatic representation of another embodiment of the invention.
Figure 5:
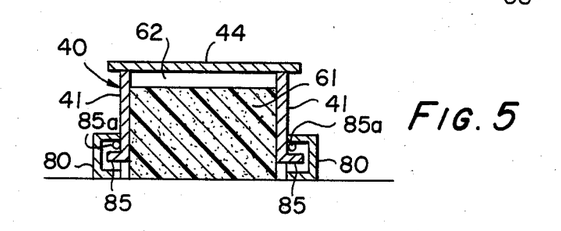
FIG. 5 shows a cross-section on the line V—V of FIG. 4.

The invention may be applied to a larger mould, with additional benefits. Referring to FIGS. 4 and 5, there is shown an elongate channel-like mould 40 having side walls 41 and end walls 42 and 43. A removable mould cover 44 is shown extended the full length of the mould, which may be a simple sheet of flexible synthetic plastic material or may be in the form of a venetian blind, so that it may be rolled back or rolled out to uncover and cover the mould.

The end wall 42 carries a gas collection chamber 65 connected by a pipe 66, through a manifold 67 to an extractor fan 68. The output of the fan is connected, via an optional accumulator pressure tank 70, to a scrubbing unit 71 which leads to an active carbon filter 72. The unit 71 absorbs smaller quantities of T.D.I. and amine and the filter of this unit must be replaced after saturation and the contents burned. The filter 72 will collect Freon 11 and/or methylene chloride and, after saturation, will be re-cycled by a standard re-cycling unit, as described with reference to FIG. 1.

In this embodiment, the clean air output of the filter 72 is connected to an air dryer 73, incorporating a manifold (not shown) similar to manifold 67. The output of the dryer is returned to the mould by way of a flexible pipe 74 and a chamber 75, similar to chamber 65, carried by the end wall 43. The chambers 65 and 75 communicate with the mould by way of one or more apertures extending across the related end wall near the top edge of the wall below the level of the cover 44.

Externally of the mould and extending along the bottom edge of each side wall 41 is a duct 80 mounted in a gas-tight manner to the mould wall. The end of each duct adjacent the end wall 42 is connected by a pipe 81 to the manifold 67 and the other end of each duct is connected by a pipe 82 to the air dryer 73. Along the bottom edge of each side wall 41 is a series of hinged hatches or traps 85 which can be pivoted out of the plane of the side wall to the position shown in FIG. 5, thereby opening apertures 86 (FIG. 4) leading from the interior of the mould to the respective duct 80. The traps may be spring loaded to open and released by suitable catch means actuated externally of the ducts.

FIGS. 4 and 5 show the mould after foam reactants have been deposited in the mould and with the foam fully expanded as seen at 61 in FIG. 5, the top cover 44 being extended to fully cover the mould. The manner in which the foam reactants are deposited is not the subject of the present invention and may be effected by the method and apparatus of the invention described in our co-pending application Ser. No. 610,494 of even date (now U.S. Pat. No. 4,530,807 of July 23, 1985) claiming priority from our British Patent application No. 8314010.

Prior to depositing foam reactants in the mould 40, and with the cover 44 rolled back, the inner surfaces of the mould bottom, side walls and end walls are covered with the lining sheets (not shown) of thin polyethylene film. The side wall lining sheets are secured positively to the surface of each closed trap 85, as by adhesive, and if necessary perforated or otherwise weakened around each trap so that, when the trap is opened, the corresponding portion of the lining will be carried away with it to clear the aperture 86. Alternatively, the mould surfaces may consist of permanently—fixed polyethylene sheet material, in which case the surfaces including the traps 85 may be coated as by spraying with a mould release wax.

Assuming that foam reactants are deposited in the mould by lay-down means (not shown) which travels along the mould from left to right as seen in FIG. 4, the cover 44 is gradually unrolled over the expanding foam. Conveniently, the leading edge of the cover may be attached to the lay-down means for this purpose. At the commencement of foam lay-down, fan 68 is switched on and gases escaping from the top of the expanding foam are drawn off along pipe 66 together with entrained ambient air. Until the mould is fully covered by the cover 44, clean air re-circulated through chamber 75 is exhausted, at least in part, to atmosphere. Thereafter, this air flows through space 62 (FIG. 4) above the fully-expanded and curing foam 61 and is continuously re-circulated through the system.

By circulating dry air through the space 62 the curing conditions are optimized, resulting in an improved hardness distribution through the cross-section of the foam block. Also, the internal temperature of the block may be controlled by adjusting the volume of air circulated. In order to reduce the possibility of scorching the foam surface, an inert gas such as $CO_2$ or $N_2$ may be introduced to the circulated air.

During the initial stage of foam lay-down and when expanded foam adjacent the end wall 42 has gelled sufficiently, the opposing traps 85 either side of the gelled foam are opened. Thereafter, as lay-down proceeds, each pair of opposite traps is opened in succession after the adjacent foam has gelled. Thus gases, and in particular gases such as Freon 11 and methylene chloride, flow from the foam by way of the apertures 86 into the ducts 80, and are entrained by air circulating in the system including the pipes 82, ducts 80 and pipes 81. Thus, when foam lay-down is completed, all the traps 85 are open and the whole foam block within the mould is subjected to the gas-removal process, gases leaving the block being replaced by air from the space 62.

The size of the apertures 86 and their spacing along the mould may be selected within a wide range in terms of the total area of the apertures as a percentage of the area of the bottom of the mould. With apparatus like that shown in FIG. 4, it has been found that a percentage as low as 2% is satisfactory.

Figures 5, 6:
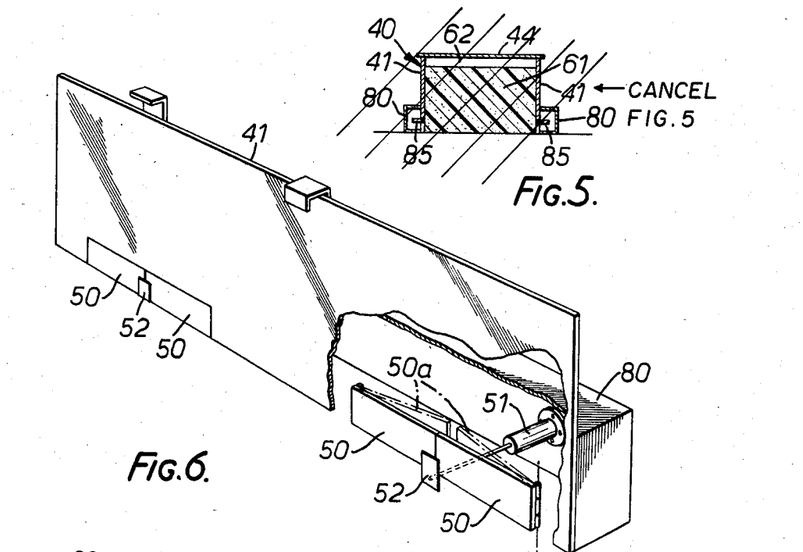
FIGS. 6 to 8 each show a scrap view of a mould side wall, from within the mould of FIG. 4, and details of alternative aperture closure means.
Figures 7, 8:
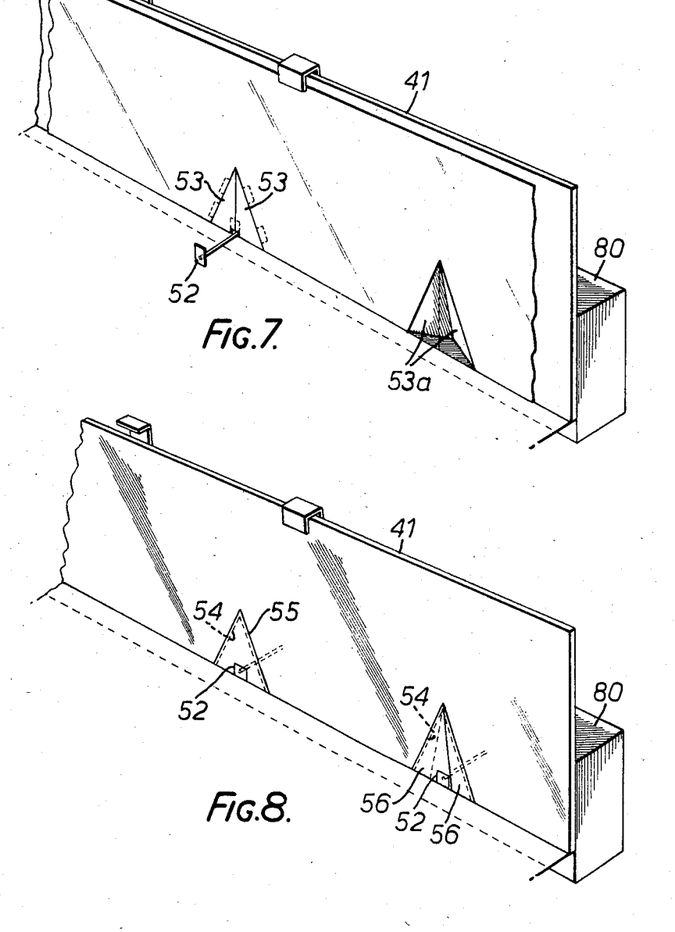

The traps 85 have been shown as a single rectangular flap hinged by hinges 85a along the top edge. Alternatively, the traps may be as shown in FIG. 6 and comprise two co-operating rectangular flaps 50 hinged along vertical edges and spring-loaded to the closed position shown to the left-hand side of the drawing. Such a trap may be operated by a three-position air cylinder 51 located within the duct 80, the actuating rod of which carries a plate 52 located within the mould. In a first position of the cylinder 51, the plate 52 is spaced from the mould side wall 41 to permit installation of the aforementioned lining sheet. The cylinder is then operated to its intermediate position in which the plate 52 holds the lining sheet against the closed flaps 50. When the trap is to be opened, the cylinder is operated to its third position in which the flaps are opened as at 50*a* and the lining sheet is stretched or distorted by the plate 52 to open an aperture below the lower edge of the lining sheet or to tear the lining sheet around the space between the open flaps 50*a*. An alternative, and preferred, shape of the traps is shown in FIG. 7 in which the aperture is triangular and flaps 53 are triangular and hinged so that the base edge of each flap is moved upwardly, as indicated at 53*a*, when the trap is opened, thereby creating an opening below the flaps.

If the mould side wall surfaces are of polyethylene, as hereinbefore mentioned, so that they may be coated with a mould release wax and lining sheets are not required, then the sidewall apertures may be covered by a sheet of elastic material which constitutes the trap. Referring to FIG. 8, the left-hand triangular aperture 54 is covered by a permanently-secured triangular sheet 55, of for example silicon rubber which is stretched by the plate 52 to reveal the required trap opening. Alternatively the sheet 55 may be replaced, as shown in the right-hand side of FIG. 8, by two overlapping triangular sheets 56 of a suitable material, such as glass fabric coated with polytetrafluoroethylene. The sheets flex and slide relatively to each other under the pressure of the plate 52 to reveal the trap opening.

Figure 9:
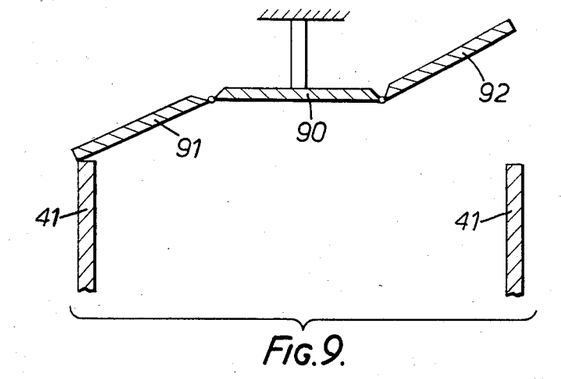
FIGS. 9 and 10 show alternative mould closure means.
Figure 10:
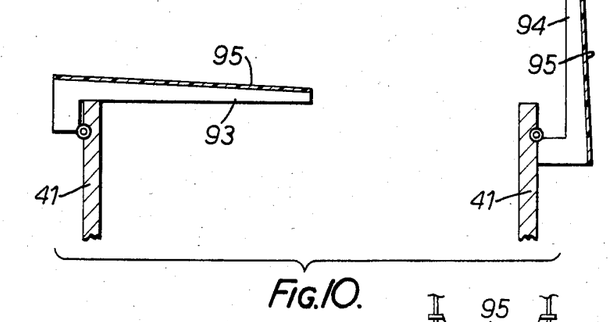

FIGS. 9 and 10 show alternative means for covering the mould in place of the cover 44 hereinbefore described. The figures represent a view looking down the mould from one end. In FIG. 9, the cover comprises a central cover panel 90 located above the side walls 41 of the mould and extending the length of the mould between the end walls. Hinged to the longitudinal edges of panel 90 are a series of smaller panels 91 and 92, each series extending the length of panel 90. These panels may be individually hinged to a closed position (panel 91) to lie on the top edge of the side wall or to an open position (panel 92). With this arrangement, each pair of opposite panels 91, 92 may be closed in sequence as foam laydown proceeds, in order to form a cover over the mould.

Figure 11:
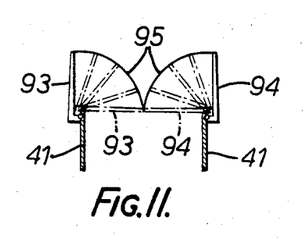
FIG. 11 shows the closure means of FIG. 10 in use.
Figure 12:
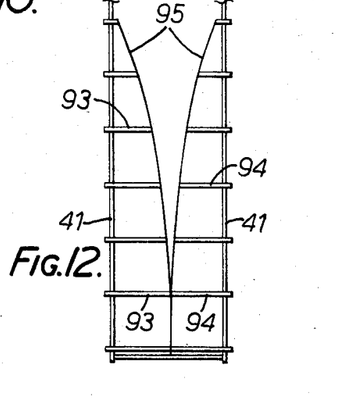
FIG. 12 shows a plan view of FIG. 11.

In FIG. 10, the cover comprises a series of arms 93, 94 hingedly secured adjacent the upper edge of the respective sidewall 41. Each series of arms extends the length of the mould between the end walls, the arms being spaced apart so as to serve as supports for a sheet of plastics film 95. The illustrated arm 93 is shown in the cover-closed position and the arm 94 in the cover-open position. FIG. 11 is a view in the same direction as that of FIG. 10 (on a much-reduced scale), in which successive pairs of arms are seen in their respective positions as the cover is gradually closed over the mould. FIG. 12 is a corresponding plan view, from which it will be noted that the sheets of film 95 gradually come together preferably with an overlap of approximately 15 cms, as though a zip-fastener were being pulled along the centre line of the mould.

With either cover arrangement, the panels 91, 92 or the arms 93, 94 may be positioned manually or by some form of power-driven mechanism.

I claim:

1. A method of manufacturing polymeric foam, comprising depositing a mixture of foam reactants in a mould, closing the mould and allowing the reactants to react and expand therein; maintaining at substantially atmospheric pressure the space within the mould above the upper surface of the reacting and expanded foam whilst preventing escape to the atmosphere of substantially all gases emanating from the foam, supplying air to the upper surface of the expanded foam following full expansion thereof, drawing at least some of said supplied air downwardly through the foam to entrain gases present therein, extracting the air and entrained gases from the mould through an outlet located in the lower region thereof, and collecting said entrained gases.

2. The method of claim 1, wherein said gases are removed from the bottom of the mould.

3. The method of claim 1, wherein said gases are removed from a side of the mould.

4. The method as defined in claim 1, wherein said gases are removed through an aperture in the mould and the area of said aperture is selected from a range of available areas.

5. The method as defined in claim 1, wherein said mould is of elongate channel shape and said gases are removed through a plurality of apertures spaced along the length of the mould.

6. The method as defined in claim 1, wherein gases are removed through a closable aperture, said aperture is closed until the foam has completed expansion, and thereafter said aperture is opened and the gases removed.

7. The method as defined in claim 1 wherein a predetermined interval of time is allowed to elapse between completion of foam expansion and the commencement of gas removal.

8. The method as defined in claim 1, wherein the air supplied to the upper surface of the expanded foam and is drawn down through the foam to remove said gases.

9. The method as defined in claim 1, wherein said air is dry air.

10. The method as defined in claim 1, wherein the removed gases are fed to means for absorbing noxious gases.

11. The method of claim 10, wherein some at least of the absorbed noxious gases are collected for re-use.

12. The method of claim 10, wherein after the noxious gases have been removed, the remaining gases are recirculated to the mould.

13. The method as defined in claim 1 wherein air is circulated through a space between the upper surface of the expanded foam and the mould closure.

14. The method as defined in claim 1, wherein said mould is of elongate channel shape and the mixture of foam reactants is deposited progressively along the length of the mould, and said mould is closed progressively over the deposited mixture.

15. Apparatus for manufacturing polymeric foam, comprising a mould (1,2 or 40), means (21) for depositing a mixture of foam reactants in said mould and a closure (3,44) for said mould, said closure (3,44) permitting the interior of the mould to be maintained at substantially atmospheric pressure, means (6) for supplying air to the mould below and adjacent said closure, an air outlet (5*a*,86) located in the lower region of said mould, air extraction means (10,68) connected to said outlet for drawing supplied air from adjacent said closure means downwardly through said mould and through said outlet, and means (12,15,18; 70-73) connected to the output of said air extraction means for collecting gases such as emanate from polymeric foam during manufacture.

16. Apparatus as claimed in claim 15, wherein said means (5) for removing gases is located in the bottom of the mould.

17. Apparatus as claimed in claim 15, wherein said means (85) for removing gases is located in the side of the mould.

18. Apparatus as defined in claim 15, wherein said means (5) for removing gases includes an aperture (5a), comprising means (26,26,27) for selecting the area of said aperture from a range of available areas.

19. Apparatus as defined in claim 15, wherein said mould is of elongate channel shape, comprising a plurality of means (85) for removing gases spaced along the length of the mould.

20. Apparatus as defined in claim 15, wherein the means (65 to 75) for supplying air includes means (73) for drying the air.

21. Apparatus as defined in claim 15 including means (71,72) for absorbing noxious removed gases.

22. Apparatus as claimed in claim 21, including means (17,18) for collecting absorbed noxious gases for re-use.

23. Apparatus as defined in claim 15, wherein said means (65–75) for supplying air re-circulates air leaving the mould.

24. Apparatus as defined in claim 15, wherein said mould is of elongate channel shape and said means (21) for depositing said mixture of foam reactants is adapted to deposit the mixture progressively along the length of the mould; characterised in that said closure (44) is adapted to progressively close the mould over the deposited mixture.

25. Apparatus as claimed in claim 24, wherein said closure comprises a series of hinged panels (91,92) mounted over and extending along the mould and capable of being individually opened and closed.

26. Apparatus as claimed in claim 24, wherein said closure comprises a series of arms (93,94) extending along each side wall (44) of the mould and hingedly attached thereto, and a sheet (95) of flexible material extending the length of the mould and attached to and supported by said series of arms; whereby by pivoting selected arms to overlie the mould the sheets of material may be brought together progressively to cover the mould.

27. Apparatus as claimed in claim 19 or any claim appendant thereto, wherein said means for removing gases comprises an aperture (86) in the mould, means (85) for closing said aperture, and means for moving said closing means to open said aperture.

28. Apparatus as claimed in claim 27, wherein said means for closing said aperture comprises two cooperating flaps (50) hinged to respective sides of the aperture, and the means (52) for moving said flaps is operable to engage said flaps and move them out of their copperating relationship thereby at least partially to open said aperture.

29. Apparatus as claimed in claim 28, wherein said aperture is triangular in shape, said flaps (53) are each triangular in shape, and said means (52) for moving said flaps is operable to move the base edge of each flap upwardly.

30. Apparatus as claimed in claim 27, wherein said means for closing said aperture (54) is a sheet (55) of elastic material permanently secured over said aperture, and said means (52) for moving said sheet is operable to stretch said sheet out of the plane of said aperture thereby at least partially to open said aperture.

* * * * *